United States Patent [19]

Blümcke et al.

[11] Patent Number: 5,852,292
[45] Date of Patent: Dec. 22, 1998

[54] METHOD OF OPERATING AN OPTICAL LIGHT SENSOR

[75] Inventors: Thomas Blümcke, Gutach; Jürgen Bürger, Emmendingen; Fritz Kuhn, Waldkirch; Klaus-Jürgen Leiting, Teningen, all of Germany

[73] Assignee: Sick AG, Waldkirch/Breisgau, Germany

[21] Appl. No.: 727,061

[22] Filed: Oct. 8, 1996

[30] Foreign Application Priority Data

Oct. 9, 1995 [DE] Germany .................. 195 37 615.3

[51] Int. Cl.⁶ ............................................ H01J 40/14
[52] U.S. Cl. ................... 250/221; 250/222.1; 250/214 B
[58] Field of Search .................. 250/214 B, 214 AL, 250/214 R, 221, 222.1, 223 B

[56] References Cited

U.S. PATENT DOCUMENTS

| | | | |
|---|---|---|---|
| 4,851,689 | 7/1989 | Hasegawa | 250/214 B |
| 4,973,834 | 11/1990 | Kim | 250/221 |
| 5,099,113 | 3/1992 | Oi et al. | 250/214 B |
| 5,208,452 | 5/1993 | Osaragi | 250/214 B |
| 5,250,801 | 10/1993 | Grozinger et al. | 250/223 B |
| 5,550,369 | 8/1996 | Skell et al. | 250/222.1 |

*Primary Examiner*—Edward P. Westin
*Assistant Examiner*—John R. Lee
*Attorney, Agent, or Firm*—Townsend and Townsend and Crew LLP

[57] ABSTRACT

A method for operating an optical light sensor for the detection of objects present in the monitored region in which light signals are transmitted into the monitored region in specific time intervals. The transmitted light signals and also the interference signals which occur are received and are evaluated for the detection of objects present in the monitored region, with the transmission reception of the light signals, and also the reception of the interference signals, respectively taking place in time sequential frame intervals. In the absence of an interference signal within a frame interval the transmission of the light signal takes place at the end of the frame interval defining a normed transmission timepoint for the respective light signal. On the occurrence of an interference signal within a frame interval the transmission of the next light signal is delayed timewise relative to its normed transmission timepoint. Furthermore a light sensor of this kind is described.

42 Claims, 4 Drawing Sheets

METHOD OF OPERATING AN OPTICAL LIGHT SENSOR

BACKGROUND OF THE INVENTION

1. Field of the Invention

The present invention relates to a method of operating an optical light sensor for detecting objects present in a monitored region, and to such a light sensor.

2. Description of the Prior Art

Optical light sensors are normally formed as reflection or transmission light sensors. In a reflection light sensor, the transmitted light signals are reflected by an object located in the monitored region and the reflected light signals are received by a light receiver such that the presence of the object in the monitored region can be recognized as a result of the received light signals. In contrast, in a transmission light sensor the transmitted light signals are received either directly to via a reflector by a light receiver in the absence of an object in the monitored region. The reception of the transmitted light signals is interrupted by an object present in the monitored region or the received light signals are at least weakened such that the presence of an object in the monitored region can be recognized thereby.

Light pulses or sequences of light can be used as light signals. A pause which is comparatively long with respect to the light pulse duration, or with respect to the duration of the sequence of light pulses after which the next light signal is transmitted, follows each transmitted light pulse or each transmitted light pulse sequence. Through the use of light pulses or sequences of light pulses, one achieves an improved signal/noise ratio for the short transmission time interval relative to continuous transmitter operation for the same power dissipation. Furthermore, the influence of constant light can be eliminated in a simple manner by the insertion of a high pass filter into the processing stage for the received signal.

When using optical light sensors interfering light acting from the outside may cause objects present in the monitored region to not be recognized. Additionally, such interfering light may incorrectly detect the presence of objects in the monitored region. The interference signals which must frequently occur can thereby be classified into three classes:

1. Periodic sinusoidal signals with high harmonic contents, such as, for example, those produced by neon tubes with electronic ballast units (termed high frequency lamps in the following),
2. periodic rectangular signals with any desired mark space ratio such as, for example, those transmitted by neighboring light sensors, and
3. interference signals which occur just once (termed in the following "once-only-interference signals") which can be incident onto the light receiver due to any external action.

In contrast to interference signals which occur once only, periodic sinusoidal or periodic rectangular signals, and also stochastic interference signals of variable amplitude, will be referred to as alternating interference signals.

SUMMARY OF THE INVENTION

An object of the present invention is to provide an optical light sensor which has a high security against interference, in particular against interference through externally acting interfering light of the above-named kinds and a method of operating such an optical light sensor. Operation with a high switching frequency should also be simultaneously possible.

Those objects are satisfied in accordance with the present invention by a method of operating an optical light sensor to detect objects present in a monitored region wherein light signals are transmitted at specific time intervals into the monitored region, the transmitted light signals and also any arising interference signals are received and are evaluated to detect objects present in the monitored region, with the transmission and reception of the light signals and also the reception of the interference signals respectively taking place in frame intervals which follow one another timewise. In the absence of an interference signal within a frame interval, the transmission of the light signal takes place at the end of the frame interval defining a normed transmission timepoint of the respective light signal. On the occurrence of an interference signal within a frame interval, the transmission of the next light signal is delayed timewise relative to its normed transmission timepoint.

Through the method of the present invention, it is ensured that an ideal transmission timepoint for the light signal within a frame interval is determined in the event of interference so that the effect of the interference signal on the received light signal is minimal. On the occurrence of a once-only-interference signal, the light signal is normally transmitted after it has died away. With an alternating interference signal, the light signal is transmitted during a favorable phase of this interference signal. By specifying a frame interval within which the light signal is transmitted, a specific high switching frequency can be achieved with a simultaneous high security against interference, In particular, it is ensured, since a light signal is transmitted once in each frame interval, that, on average, a constant signal transmission takes place.

In accordance with a preferred embodiment of the present invention, the interference signal occurring within a frame interval is classified as an alternating interference signal or as a once-only-interference signal and the timepoint for the transmission of the light signal is determined in dependence on the respective classification and/or on the absence of an interference signal in the frame interval. Through the classification of the interference signals which arise, an ideal interference minimization can be achieved for each class. The method of the present invention can however also be used without classification if, for example, only a specific class of interference signals can occur.

In accordance with a further advantageous embodiment of the present invention, the evaluation of the interference signal to determine the ideal transmission timepoint of the light signal is interrupted during the transmission of the light signal. This can, for example, be achieved in that during the duration of the transmission of the light signal, the received total light signal is only used for evaluation with respect to determining whether an object is present in the monitored region, whereas outside of the duration of the transmission of the light signal, the received interference signal is exclusively evaluated to determine an ideal transmission timepoint for the next light signal. In this way it is ensured that light signals received within the transmission interval are not incorrectly interpreted as interference signals and thereby influence the transmission of the next light signal.

The object of the present invention relating to the apparatus is satisfied by a light sensor. An optical light sensor for detecting objects present in a monitored region in accordance with the present invention comprises a light transmitter for the transmission of light signals in specific time intervals, a light receiver for receiving transmitted light and any occuring interference signals, and an object signal evaluation unit for evaluating the received signals. An interference signal evaluation unit evaluates received interference signals in the time interval between two sequentially transmitted light signals and includes a counter for determining the length of the negative halfwaves of an alternating interference signal or for generating a control signal for the transmission of a light signal by the light transmitter on reaching a specific count after the occurrence of a once-only-interference signal. The use of a counter ensures that the ideal transmission timepoint for the light signal can be determined within a frame interval in a simple manner so that the effect of the interference signal on received light signals is minimal.

DETAILED DESCRIPTION OF THE PREFERRED EXEMPLARY EMBODIMENTS

Figure 1:
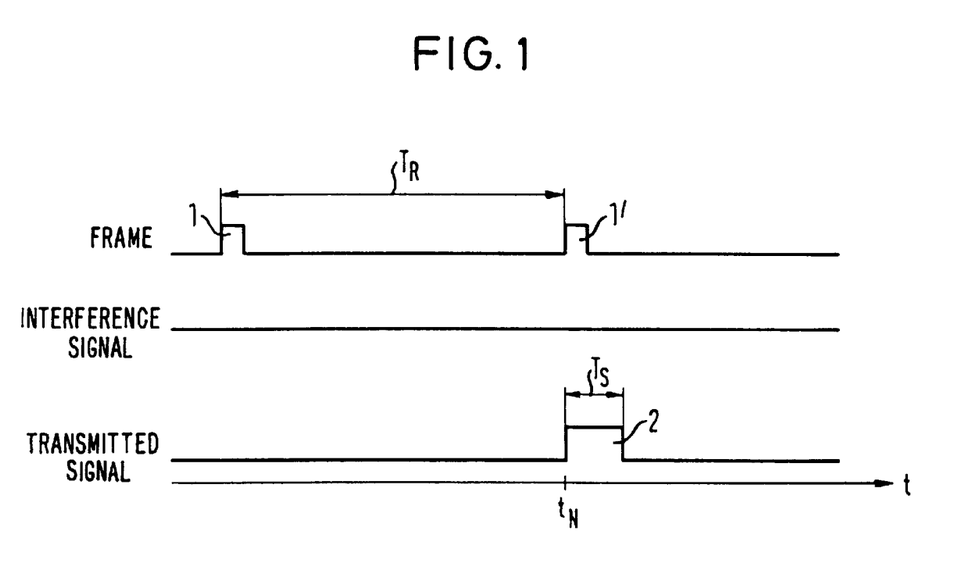
FIG. 1 is a signal/time diagram related to the method of the present invention in the absence of an interference signal.

The method of the present invention is based on the setting of a time grid (frame) which is defined by frame pulses 1, 1' in FIG. 1 which are arranged at time intervals $T_R$ after one another and thereby form frame intervals $T_R$.

The received signal is observed starting with the frame start and is investigated for the reception of interference signals during the frame interval $T_R$ in order to determine the ideal timepoint for the transmission of the next light signal independently of an occurring interference signal. If no interference signal occurs up to the end of frame interval $T_R$, then the next light signal is transmitted at its normal transmission timepoint $t_N$ as is illustrated in FIG. 1. In FIG. 1 the light signal is illustrated by a rectangular transmitted pulse 2 with the width $T_S$ (transmission interval $T_S$). The light signal can however, for example, also be formed by a sequence of light pulses or by a signal of any desired shape.

During the transmission interval $T_S$, the evaluation of the received signal for the determination of an ideal transmission timepoint is interrupted and the received signal is used for the determination of objects present in the monitored region. A signal value received during the transmission interval $T_S$ specifies the presence or the absence of an object in the monitored region depending on whether the method is used with a reflection light sensor or with a transmission light sensor.

After the end of the transmission interval $T_S$, the apparatus is again switched over to receipt and evaluation of an interference signal in order to determine the ideal transmission timepoint for the next transmitted pulse independently of an interference signal arriving in the next frame interval $T_R$. It is however also possible to allow the evaluation of the received signal for the determination of the ideal transmission timepoint to continue to run in parallel during the transmission interval $T_S$ so that in this manner, the determination of the ideal transmission timepoint for the next light signal already starts earlier. This is in particular sensible when the transmission of the actual light signal takes place at the end of the frame and the transmission interval $T_S$ extends into the start of the next frame.

Figure 2:
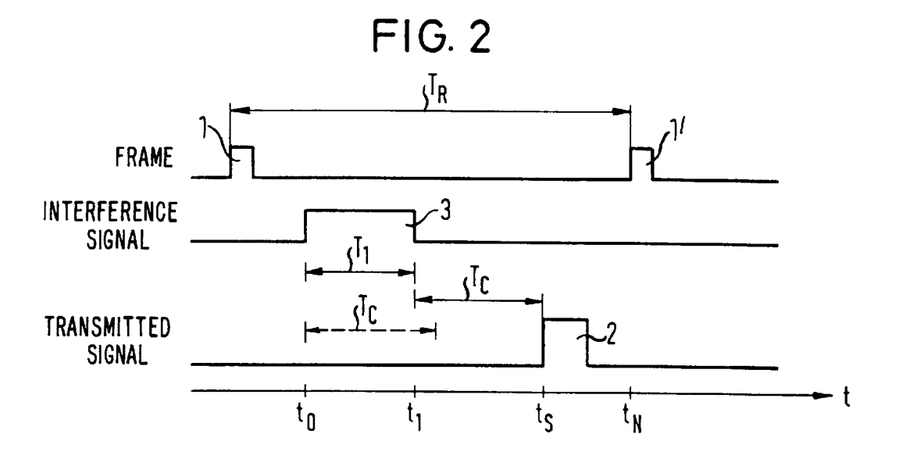
FIG. 2 is a signal/time diagram on the occurrence of a once-only-interference signal.

If a once-only-interference signal $T_R$ occurs during a frame interval $T_R$, as is illustrated in FIG. 2, then a waiting time $T_C$, illustrated in broken lines in FIG. 2, is triggered at the start of the interference signal 3 at the time $t_0$. If a signal flank again occurs during the waiting time $T_C$, as is the case at the time $t_1$ in FIG. 2, then the waiting time is prematurely terminated and started anew.

Since, in the case illustrated in FIG. 2, no further interference signal occurs within the second waiting time $T_C$, the transmitted pulse 2 is transmitted at the time $t_S$ prior to its normal transmission timepoint $t_N$ after the expiration of the second waiting time $T_C$. If the duration $T_1$ of the interference signal 3 is no longer than the waiting time $T_C$, then the transmitted pulse 2 is transmitted during the high interference level. Advantageously it is therefore not the level of the received signal which is directly evaluated, but rather the level difference between the received signal during the transmission interval $T_S$ and the received signal shortly before the transmission interval $T_S$ that is evaluated as the detection signal. In this manner it is possible to prevent an interference signal received during the transmission interval $T_S$ which exceeds the threshold value set for detection from initiating a faulty object detection signal.

The triggering of the waiting time $T_C$ can be controlled by the occurrence of signal flanks or also by attaining or exceeding or falling short of preset threshold values. In this respect a waiting time $T_C$ is advantageously only triggered when a positive threshold value is exceeded or a negative threshold value is fallen short of. In this way it is, for example, ensured that transient oscillation processes which die away do not trigger a further waiting time $T_C$.

The waiting times can, for example, be realized by a counter, as is described in more detail with reference to FIG. 7, with the length of the waiting time $T_C$ being definable by a predeterminable count.

A decision as to whether the present interference signal is a once-only-interference signal or an alternating interference signal can, for example, take place by counting the number of triggered waiting times $T_C$. For example, with rectangular interference signals, such as illustrated in FIG. 2, a maximum of three waiting times $T_C$ can be triggered, namely by the raising flank, by the falling flank and by the end of the transient oscillation process following the falling flank. If a fourth waiting time $T_C$ is thus triggered by the interference signal or the third waiting time $T_C$ is prematurely terminated, then—in accordance with the method of the present invention—one is no longer concerned with a once-only-interference signal but rather with an alternating interference signal, which is, for example, dealt with in accordance with the description of FIGS. 5 to 7. In this manner the number of waiting times $T_C$ which arise, or the prematured termination of a waiting time $T_C$, can be used as an unambiguous feature distinguishing between once-only-interference signals and alternating interference signals.

Figure 3:
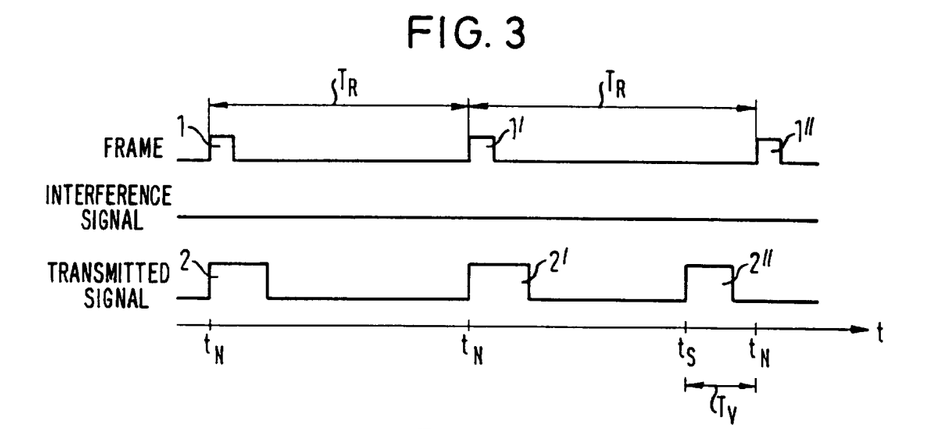
FIG. 3 is a signal/time diagram related to a further embodiment of the method of the present invention in the absence of an interference signal.

FIG. 3 shows a special embodiment of the method of the invention for the case that no interference signal occurs during a larger number of sequential frame intervals. As described in connection with FIG. 1, the transmitted pulse 2 is normally transmitted in the case of no interference at its normal transmission timepoint $t_N$ at the end of the frame interval $T_R$. However, the frame end does from a critical point in time with respect to the recognition of interference and interference suppression.

If, for example, the transmitted transmission pulses of a neighboring light sensor coincide with the respective frame ends, and thus with the transmission timepoints of a light sensor operating in accordance with the method of the present invention in the interference free case, and if these transmitted foreign transmission pulses are received by the light sensor operating in accordance with the present invention as interference signals, then these interference signals cannot be used to determine any ideal transmission timepoints of the light signal. In addition the transmitted pulses of the neighboring light sensor received as interference signals can lead to a faulty evaluation of the received light signal since, depending of the nature of the light sensor, the presence or absence of an object in the monitored region can be falsely detected.

This is prevented in accordance with the embodiment of the method of the present invention shown in FIG. 3 in that the transmission of the transmission pulse 2" already takes place at a time $t_S$ which is advanced relative to the normal transmission timepoint $t_N$ of the transmission pulse 2" by the time interval $T_V$ when an interference signal is recognized neither in the actual frame interval $T_R$ up to the timepoint $t_S$ nor in one of the three preceding frame intervals. In this manner interference signals which are respectively received in parallel with the frame ends, such as can be generated, for example, by neighboring light sensor, are recognized in transmission interval $T_S$ after the transmission of the transmission pulse 2" so that as a result of these interfering pulses, the ideal transmission timepoint for the next light signal can be determined, as was described in relation to FIG. 2.

Figure 4:
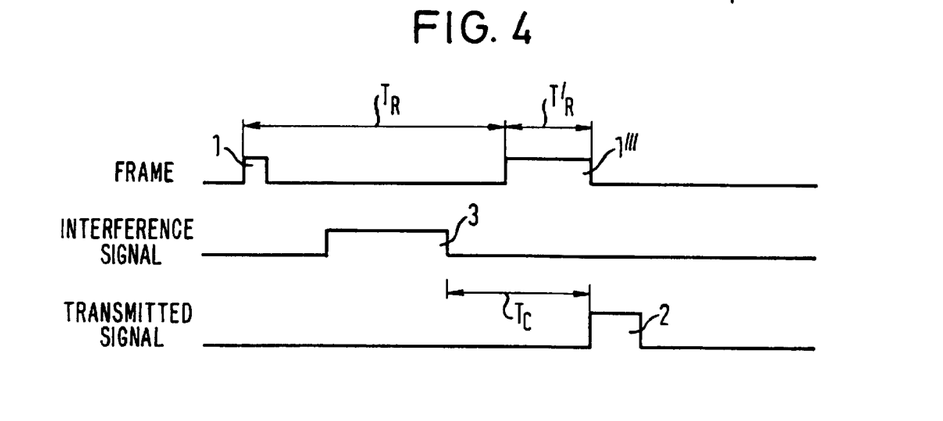
FIG. 4 is a signal/time diagram related to a further embodiment of the method of the present invention on the occurrence of a once-only-interference signal.

In FIG. 4 there is shown a special case of the method described in accordance with FIG. 2 for the treatment in accordance with the invention of once-only-interference signals. As in the time diagram of FIG. 2, a waiting time $T_C$ is triggered by the end of the interfering pulse 3. Since, in the example in FIG. 4, the end of the waiting time $T_C$ would lie timewise after the end of the frame interval $T_R$, the frame interval is in this case extended by the remaining interval $T_R'$ so that the end of the waiting time $T_c$ coincides with the end of the total frame interval $T_R+T_R'$. On the expiration of the waiting time $T_C$, the transmission pulse 2 is subsequently transmitted, as in the case of FIG. 2. The frame interval $T_R$ which follows the extended frame interval $T_R+T_R'$ again has the original length.

In this manner a situation is, for example, achieved in which the transmitted light signals of two adjacently disposed light sensors operating with the same transmission frequency do not lead to collisions at the frame end. Through the extension of the frame interval of one of the two light sensors, a situation is achieved in which the phase between the frame signals of the two light sensors is displaced once in such a manner that no collisions any longer occur. In this manner it is ensured that the transmitted pulses of the two systems can be transmitted with time displacement relative to one another and consequently that no mutual interferences are caused.

Figure 5:
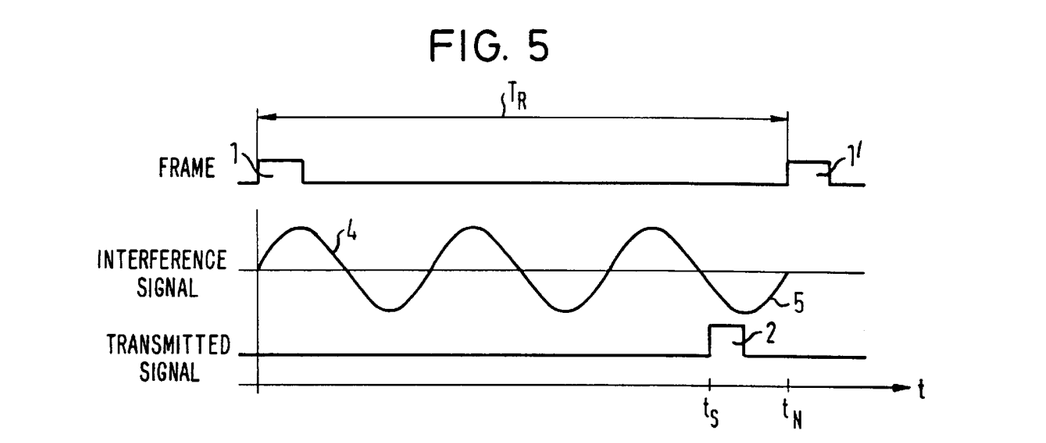
FIG. 5 is a signal/time diagram on the occurrence of a sinusoidal interference signal.

A periodic sinusoidal signal is illustrated in FIG. 5. As in the evaluation of once-only-interference signals, the received signal is first observed at the start of the frame interval $T_R$ and classified in accordance with its nature. This can, for example, take place, as described in connection with FIG. 2, in that waiting times $T_C$ are triggered on reading or exceeding or falling short of predetermined threshold values and with the received signal being classified as an alternating interference signal, for example as a sinusoidal interference signal in accordance with FIG. 5 , if more than three waiting times $T_C$ are triggered or if a third waiting time $T_C$ is prematurely terminated. Advantageously, instances of the threshold values being exceeded or fallen short of shortly after each other, such as are, for example, present with zero passages of the signal, only trigger one waiting time $T_C$. Fundamentally it is however advantageous when the received signals are cleared of DC components prior to the evaluation.

After classification as an alternating interference signal has taken place, the next negative halfwave 5 of the interference signal is found and the next transmitted pulse 2 is transmitted during the duration of the negative halfwave 5. The transmission of the transmitted pulse 2 thus takes place at a time $t_S$ which is advanced timewise relative to the normal transmission timepoint $t_N$.

If the interference signal contains no negative halfwaves, then the interference signal is exclusively classified by the positive halfwave as an alternating interference signal and, after classification has taken place, the transmitted pulse 2 is transmitted in the next interference-free interval lying being two positive halfwaves. By the transmission of the transmitted pulse 2 within the negative halfwave, or within the interference-free intermediate interval, it is ensured that a faulty recognition of an object present in the monitored region does not take place under any circumstances, as will be explained in more detail herein with reference to FIG. 6.

Figure 6:
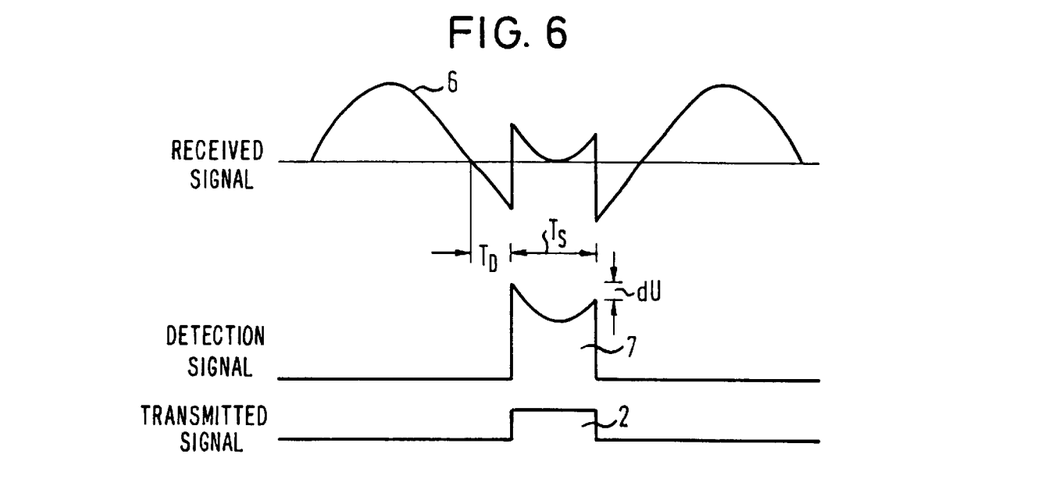
FIG. 6 is a portion of a signal/time diagram related to evaluation of the received signals.

FIG. 6 shows, in the upper half, the received signal 6 which is composed of the sinusoidal interference signal 4 of FIG. 5 and the transmitted pulse 2 which is for example, reflected at an object present in the monitored region. The transmitted pulse 2 was transmitted during the reception of the negative halfwave of the sinusoidal interference signal 4 at a time interval $T_D$ after the start of the negative halfwave so that both the start and also the end of the transmission interval $T_S$ come to lie within the reception of the negative halfwave of the sinusoidal interference signal 4.

In this manner a situation is achieved in which the detection signal 7, which is solely evaluated during the transmission time interval $T_S$ for the recognition of an object in the monitored region, has a lower level over its entire duration then the corresponding detection signal in a situation free of interference. That is to say that the difference dU of this level is negative. If the level of the detection signal 7 at the end of the signal interval $T_S$ lies above a predetermined threshold value, then this is evaluated as the recognition of an object present in the monitored region. Since in all cases only a reduction of the detection level is possible through the superposition of the received transmitted signal with the negative halfwave of the interference signal, a faulty recognition of an object can thus be precluded.

If the evaluation process is carried out with the aid of a signal integration on place of direct level detection, then equivalent signal plots result with a phase displacement between the transmitted pulse and the interference signal.

Figure 7:
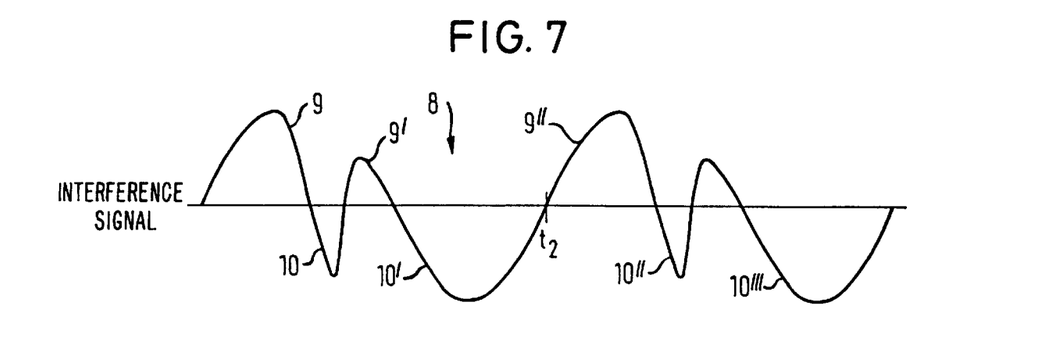
FIG. 7 is a typical record of the input signal of the light receiver on receiving light from high frequency lamps.

FIG. 7 shows a typical shape which is generated by a real high frequency lamp in a light receiver. In contrast to the sinusoidal interference signal 4 in FIG. 5, this interference signal 8 has positive and negative halfwaves 9, 9', 10, 10' of different length. Since the duration of the shorter negative halfwave is customarily less than the duration of the transmission interval $T_S$, it must be ensured that the transmitted pulse 2 is transmitted during the reception of the longer negative halfwave 10'.

Accordingly, in accordance with the method of the present invention, and following classification as a periodic interference signal, the longest negative halfwave is first determined and the transmitted pulses subsequently transmitted during the next longest negative halfwave. If, for example, the second negative halfwave 10' has been recognized as the longer negative halfwave at the time $T_2$ in FIG. 7, then it is necessary to wait until the next but-one negative halfwave 10''' before transmitting the transmitted pulse 2.

The classification and the determination of the length of the negative halfwaves thereby takes place in the following manner:

A count in the rising direction is started by the start of the first positive halfwave 9. At the start of the first negative halfwave 10, the counter is reset and a counting procedure is started again which is stopped at the end of the first negative halfwave 10. Through the stopping of the second count procedure, the interference signal is thus classified as an alternating interference signal. The count which has been reached represents a value representative for the duration of the first negative halfwave 10. At the start of the second negative halfwave 10', the counter is, for example, started in the downward direction until the count is stopped again at the start of the next positive halfwave 9''. Since the end count is positive at this time, the second negative halfwave 10' is recognized as the longer negative halfwave and the transmitted pulse 2 is transmitted during the next but-one negative halfwave 10'''.

If the end count is negative, then the transmitted pulse 2 is correspondingly transmitted during the next negative halfwave.

If the interference signal has more than two negative halfwaves of different length, then the length of the negative halfwaves can, for example, be detected by storing the counts achieved at the ends of the negative halfwaves and the longest negative halfwave can be determined following recognition of a complete period by comparison of the stored counts. The transmitted pulse is then transmitted during the next period of the interference signal during the duration of the longest negative halfwave that has been found.

Figure 8:
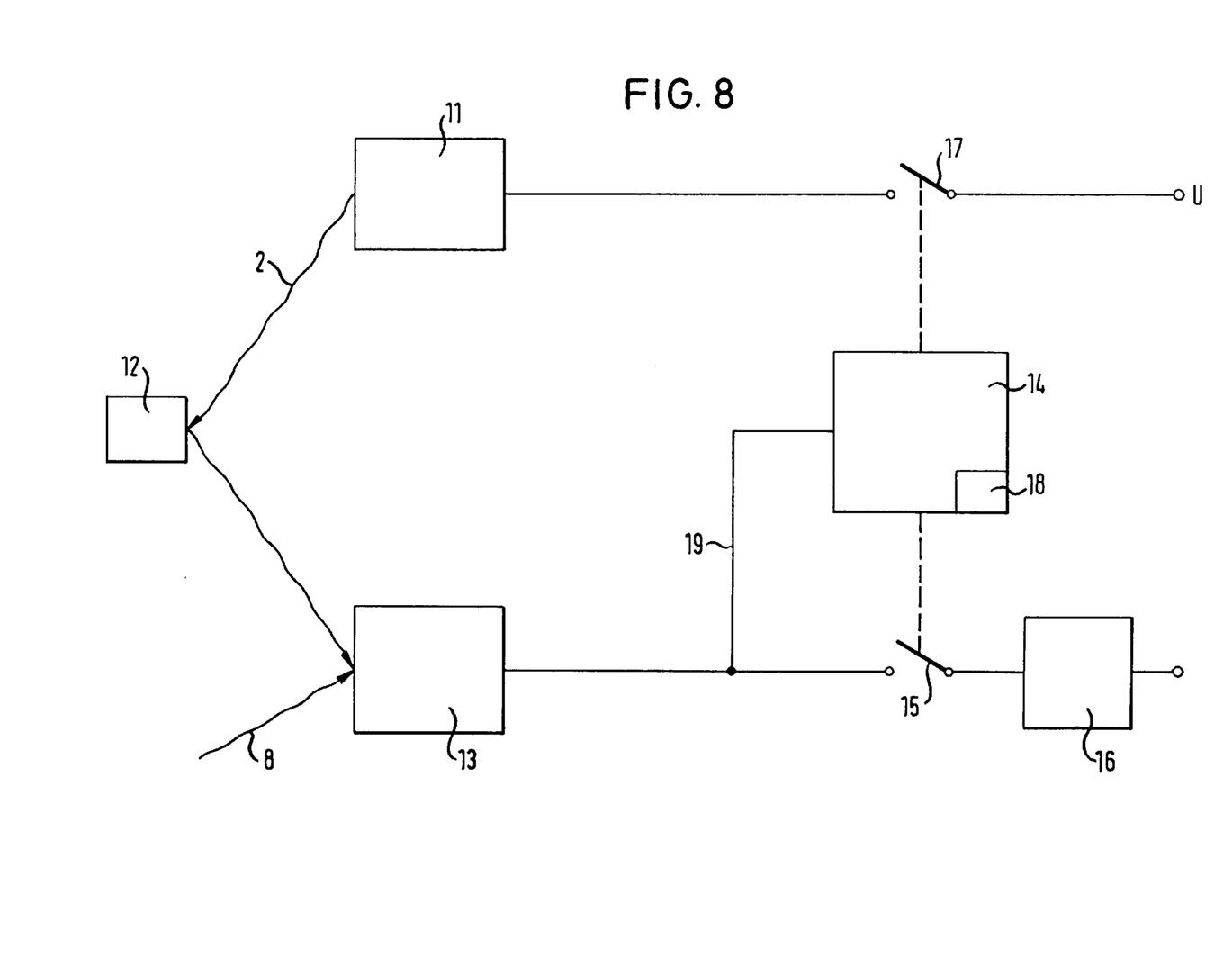
FIG. 8 is a block circuit diagram of a light sensor formed in accordance with the present invention.

The block circuit diagram of a light sensor formed in accordance with the present invention and shown in FIG. 8 includes a light transmitter 11 which transmits a transmitted pulse 2 which is reflected at an object 12 present in the monitored region. The reflected transmitted pulse is received together with an interference signal 8 by a light receiver 13, with the output of the light receiver 13 being connected via a line 19 to an interference signal evaluation until 14 and via a first switch 15 to an object signal evaluation unit 16.

The light transmitter 11 is connected via a second switch 17 to a voltage source U, with the switches 15 and 17 being synchronously actuatable by the interference signal evaluation unit 14. During the transmission interval $T_S$, the switches 15, 17 are closed so that the light transmitter 11 transmits a transmitted pulse 2 via the voltage U applied to the switch 15, which the transmitted pulse 2 being received by the light receiver 13 and being supplied via a switch 17 to the object signal evaluation unit 16. After the transmission of the transmitted pulse 2, the switches 15, 17 are again opened by the interference signal evaluation unit 14 so that the received interference signals 8 cannot influence the object signal evaluation unit 16. The received interference signals 8 are supplied via a line 19 to the signal evaluation unit 14 and are evaluated by the latter for the determination of the ideal transmission timepoint of the next transmitted pulse 2.

For this purpose, the interference signal evaluation unit 14 includes a counter 18 which is suitable for determining both the length of the negative halfwaves of the interference signals and also for realizing the waiting times $T_C$ as has been described with respect to FIGS. 2 to 7.

We claim:

1. A method of operating an optical light sensor to detect objects present in a monitored region wherein light signals are transmitted at specific time intervals into the monitored region, the transmitted light signals and also any arising interference signals are received and are evaluated to detect objects present in the monitored region, with the transmission and reception of the light signals and also the reception of the interference signals respectively taking place in frame intervals which follow one another timewise, wherein in the absence of an interference signal within a frame interval the transmission of the light signal takes place at the end of the frame interval defining a normed transmission timepoint of the respective light signal, and wherein on the occurrence of an interference signal within a frame interval the transmission of the next light signal is delayed timewise relative to its normed transmission timepoint.

2. A method in accordance with claim 1, wherein the frame intervals are substantially the same length.

3. A method in accordance with claim 1, wherein the interference signal arising within a frame interval is classified as an alternating interference signal or as a once-only-interference signal, and wherein the timepoint for the transmission of the light signal is determined in dependence on the respective classification of, or the absence of, an interference signal in the frame interval.

4. A method in accordance with claim 1, wherein with at least one of a rising or a falling flank of an interference signal arising within a frame interval, a waiting time is at least one of triggered or prematurely terminated.

5. A method in accordance with claim 1 wherein a waiting time is in each case at least one of triggered or prematurely terminated when an interference signal occurring within a frame interval at least one of falls short of or exceeds or achieves at least one of a positive or a negative threshold value.

6. A method in accordance with claim 5, wherein a waiting time is in each case at least one of triggered or prematurely terminated when a disturbing signal occurring within a frame interval exceeds a positive threshold value or falls short of a negative threshold value.

7. A method in accordance with claim 4, wherein a waiting time is in each case, at least one of triggered or prematurely terminated when two waiting times have already been triggered within a frame interval and the interference signal has fallen short of a positive threshold value or exceeded a negative threshold value prior to the expiration of the second waiting time.

8. A method in accordance with claim 5, wherein only one waiting time is triggered if the threshold values are fallen short of, exceeded or attained shortly after each other.

9. A method in accordance with claim 5, wherein the threshold values are selected to be symmetrical relative to the zero point.

10. A method in accordance with claim 4, wherein an interference signal arising within a frame interval is classified as a once-only-interference signal when the first, the second or the third waiting time expires within the frame interval.

11. A method in accordance with claim 4 wherein an interference signal arising within a frame interval is classified as an alternating interference signal when a third waiting time triggered within the frame interval is prematurely terminated.

12. A method in accordance with claim 1, wherein with an alternating interference signal occurring within a frame interval, the light signal is transmitted during the time of reception of the negative halfwave.

13. A method in accordance with claim 1, wherein with a periodic interference signal arising within a frame interval and having several differently long positive and negative halfwaves, the light signal is transmitted during the reception of the longest negative halfwave.

14. A method in accordance with claim 13, wherein the start of the first negative halfwave of the periodic interference signal arising within a frame interval triggers a counting procedure starting from a specified initial value, wherein the count achieved at the end of the negative halfwave and representative for the duration of this halfwave is stopped with a start of the subsequent positive halfwave wherein, the start of the next negative halfwave triggers a counting procedure in the opposite direction to the first counting procedure starting from the held count, and wherein the end count achieved at the start of the next positive halfwave is evaluated to determine the longer negative halfwave.

15. A method in accordance with claim 14, wherein after the determination of the longer negative halfwave the light signal is transmitted during the occurrence of the next longer negative halfwave.

16. A method in accordance with claim 14, wherein the first counting procedure is an upward counting procedure and the second counting procedure is a downward counting procedure and the light signal is transmitted during the occurrence of the next negative halfwave when the end count is greater than the initial value and the light signal is transmitted during the reception of the next but one negative halfwave when the end count is smaller than the initial value.

17. A method in accordance with claim 14, wherein the start of the first positive halfwave which arises within a frame interval triggers a counting procedure and wherein the counter at the end of the positive halfwave is reset to the initial value when the start of the positive halfwave lies before the start of the first negative halfwave occurring within the frame interval.

18. A method in accordance with claim 12, wherein the duration of the light signal and the start of the transmission of the light signal are so selected that the transmission of the light signal is terminated before the end of the negative halfwave.

19. A method in accordance with claim 1, wherein the start of an interference signal occurring once within a frame interval triggers a first waiting time and the light signal is transmitted after the expiration of the first waiting time when the first waiting time is shorter than the duration of the interference signal.

20. A method in accordance with claim 1, wherein the end of an interference signal occurring once within a frame interval triggers a second waiting time and the light signal is transmitted after expiration of the second waiting time when no further interference signal is received during the second waiting time.

21. A method in accordance with claim 4, wherein the waiting times are realized by counting procedures and the expiration of the waiting times on achieving a predetermined count or when the counter runs over.

22. A method in accordance with claim 4, wherein the waiting times are of the same length.

23. A method in accordance with claim 1, wherein the frame interval is extended when the end of the waiting time lies timewise behind the end of a frame interval having a normal length.

24. A method in accordance with claim 23, wherein the frame interval is extended up to the expiration of the waiting.

25. A method in accordance with claim 11, wherein the frame interval is extended when the negative halfwave during which the next light signal is to be transmitted, lies timewise behind the end of a frame interval having a normal length.

26. A method in accordance with claim 25, wherein the frame interval is extended up to the transmission of the light signal.

27. A method in accordance with claim 1, wherein the received signal is free from DC signal components.

28. A method in accordance with claim 1, wherein the transmission of the next light signal is advanced relative to its normed transmission timepoint by a specific time interval when, up to the start of this time interval, an interference signal has not been received either within the actual frame interval or within a specific number of preceding frame intervals.

29. A method in accordance with claim 28, wherein the duration of the time interval is fixedly predetermined.

30. A method in accordance with claim 28, wherein the duration of the time interval is randomly determined.

31. A method in accordance with claim 28, wherein the number of preceding interference free frame intervals is equal to three.

32. A method in accordance with claim 1, wherein the difference in level between the signal received during the transmission of the light signal and the signal received shortly before transmission of the light signal is evaluated as the received signal to determine the presence of an object in the monitored region.

33. A method in accordance with claim 1, wherein the evaluation of the interference signal is interrupted during the transmission of the light signal.

34. A method in accordance with claim 1, wherein the evaluation of the interference signal is interrupted until the transient oscillation processes produced by the transmitted light signal have died away.

35. A method in accordance with claim 12, wherein the alternating interference signal is a periodic interference signal having a least one positive and one negative halfwave.

36. A method in accordance with claim 14 wherein the specified initial value is zero.

37. A method in accordance with claim 16 wherein the end count that is greater than the initial value is positive.

38. A method in accordance with claim 16 wherein the end count that is smaller than the initial value is negative.

39. An optical light sensor for the detection of objects present in a monitored region comprising a light transmitter for the transmission of light signals in specific time intervals, a light receiver for receiving the transmitted light signals and also any occurring interference signals, an object signal evaluation unit for evaluating the received signals during the duration of the transmission of the light signal and for producing an object detection signal if an object is located in the monitored region, an interference signal unit for evaluating the received interference signal in the time interval between two sequentially transmitted light signals and for controlling the light transmitter, with the interference signal evaluation unit including a counter for at least one of determining the length of the negative halfwaves of an alternating interference signal or for generating a control signal for the transmission of a light signal by the light transmitter on reaching a specific count after the occurrence of a once-only-interference signal.

40. A light sensor in accordance with claim 39, wherein the interference signal evaluation unit includes a trigger stage which, on the occurrence of an alternating interference signal, brings about the transmission of the light signal during the negative halfwave of the alternating interference signal.

41. A light sensor in accordance with claim 40, wherein the trigger stage brings about the transmission of the light signal during the longest negative halfwave of the alternating interference signal.

42. A light sensor in accordance with claim 39, wherein the light receiver is only connected to the object evaluation unit via a changeover switch during the duration of transmission of a light signal.

* * * * *